United States Patent
Glazner et al.

(10) Patent No.: US 10,331,862 B2
(45) Date of Patent: Jun. 25, 2019

(54) VIEWPORT DECRYPTION

(71) Applicant: Cisco Technology, Inc., San Jose, CA (US)

(72) Inventors: Yoav Glazner, Beit Shemesh (IL); Eyal Wasserman, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 15/492,002

(22) Filed: Apr. 20, 2017

(65) Prior Publication Data
US 2018/0307806 A1    Oct. 25, 2018

(51) Int. Cl.
*G06F 21/10* (2013.01)
*H04L 9/08* (2006.01)
*H04N 5/232* (2006.01)
*G06F 3/01* (2006.01)
*H04N 5/04* (2006.01)

(52) U.S. Cl.
CPC ............. *G06F 21/10* (2013.01); *G06F 3/012* (2013.01); *H04L 9/0819* (2013.01); *H04N 5/04* (2013.01); *H04N 5/23238* (2013.01); *G06T 2210/22* (2013.01); *H04L 2209/605* (2013.01)

(58) Field of Classification Search
CPC ...................................................... G06F 21/10
See application file for complete search history.

(56) References Cited

U.S. PATENT DOCUMENTS

| 8,949,913 | B1 * | 2/2015 | Thakkar ................... G06T 1/00 725/93 |
| 9,432,629 | B2 | 8/2016 | Olsen, Jr. |
| 2004/0174998 | A1 * | 9/2004 | Youatt .................. H04N 7/1675 380/210 |
| 2010/0005028 | A1 | 1/2010 | Hartley et al. |
| 2016/0219280 | A1 | 7/2016 | Korneliussen et al. |
| 2016/0277377 | A1 * | 9/2016 | March ................. G06F 11/1402 |

(Continued)

FOREIGN PATENT DOCUMENTS

| WO | 2000020987 | 4/2000 |
| WO | 2016/154663 | 10/2016 |

OTHER PUBLICATIONS

Zhang et al.; Viewport: A Distributed, Immersive Teleconferencing System with Infrared Dot Pattern; Published in: IEEE Multi Media (vol. 20, Issue: 1, Jan.-Mar. 2013); pp. 17-27; Date of Publication: Feb. 13, 2013; IEEE Xplore (Year: 2013).*

(Continued)

*Primary Examiner* — Bradley W Holder
(74) *Attorney, Agent, or Firm* — Merchant & Gould P.C.

(57) ABSTRACT

In one embodiment, a method for protecting video content is implemented on at least one computing device and includes: receiving the video content as encrypted video data on the at least one computing device, determining a viewport within the encrypted video data, where the viewport represents a subset of a larger amount of video that is presentable at a specific point in time in the video content, decrypting at least a portion of the encrypted video data corresponding to the viewport, where at least a remaining portion of the video that is time synchronized with the viewport remains encrypted, rendering viewport video from the viewport, and playing the viewport video.

20 Claims, 4 Drawing Sheets

(56) References Cited

U.S. PATENT DOCUMENTS

| | | | |
|---|---|---|---|
| 2017/0103577 A1* | 4/2017 | Mendhekar | G06T 19/006 |
| 2018/0176468 A1* | 6/2018 | Wang | H04N 19/46 |
| 2018/0192001 A1* | 7/2018 | Boyce | H04N 19/597 |
| 2018/0192044 A1* | 7/2018 | Wang | H04N 19/40 |
| 2018/0249163 A1* | 8/2018 | Curcio | H04N 19/167 |

OTHER PUBLICATIONS

Quax et al.; Evaluation of distribution of panoramic video sequences in the eXplorative television project; Proceeding NOSSDAV '12 Proceedings of the 22nd international workshop on Network and Operating System Support for Digital Audio and Video; pp. 45-50; Jun. 7-8, 2012; ACM Digital Library (Year: 2012).*

CSI Magazine (Sep. 2016), p. 10-13.

Cho, Misung et al.; 3D Fingerprinting and Encryption Principle for Collaboration, 2006 Second International Conference on Automated Production of Cross Media Content for Multi-Channel Distribution (AXMEDIS'06), Leeds, 2006, pp. 121-127. doi: 10.1109/AXMEDIS. 2006.1.

Cruz, Laurence; Coming to a Headset Near You: The Virtual Reality Revolution (Apr. 13, 2016).

Delight VR; Customization (2016) Can be seen at: https://delight.vr.com/documentation/customization/xymatic.

Koyama, Takayoshi et al.; Live Mixed-Reality 3D Video in Soccer Stadium (2003); In Proceedings of the 2nd IEEE/ACM International Symposium on Mixed and Augmented Reality (ISMAR '03). IEEE Computer Society, Washington. DC, USA, 178-.

NEXTVR; Worlds 1st Virtual Reality Live-Broadcasting of International Champions Cup Soccermatch (2016) Can be seen at: https://virtualrealityreporter.com/nextvr-worlds-1st-virtual-reality-live-broadcasting-of-international-champions-cup-soccer-match/.

NEXTVR; GetVR (2016) Can be seen at: http://www.nextvr.com/GetVR.

Schouten, Christopher; 360-Degree Pay TV Content Protection: The Only Way to Effectively Protect the Premium Content Value Chain; posted on Jul. 14, 2016.

Zanger, Doug; First Fully Immersive VR Narrative Horror Film Set to Debut (Feb. 11, 2016).

* cited by examiner

VIEWPORT DECRYPTION

FIELD OF THE INVENTION

The present invention generally relates to preventing piracy of virtual reality video content.

BACKGROUND OF THE INVENTION

Virtual reality (VR) content is known in the art. Virtual reality (VR) typically refers to computer technologies that use software to generate realistic images, sounds and other sensations that replicate a real environment or create an imaginary setting, and simulate a user's physical presence in this environment. VR content may be rendered with or without a script depending on various factors including the purpose of the creators of the content. Viewers of VR content typically use a headset device known as a head-mounted display (HMD) to interactively navigate through different views of a virtual representation of a VR venue such as, for example, a simulated world.

Panoramic video content is also known in the art. Panoramic video content, also known as 360-degree videos, immersive videos, or spherical videos, is generated from multiple video recordings where views in multiple directions are recorded at the same time, shot using an omnidirectional camera, or a collection of cameras. During playback the viewer has control of the viewing direction like a panorama. Viewers of panoramic video content also typically use an HMD to interactively select and present a view of the panoramic content.

The HMD functions in a generally similar manner when presenting views for either VR content or panoramic video content. The HMD presents a view in the form of a "viewport", a subset of a larger amount of video that is available at a specific point in time in either the VR content or panoramic video content. When presenting VR content, a viewport is typically a two-dimensional (2D) rectangle used to project a three-dimensional (3D) scene to a position of a virtual camera. When presenting panoramic video content, a viewport is typically a selected region of a larger video image or set of images available for presentation at that time.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for protecting video content is implemented on at least one computing device and includes: receiving the video content as encrypted video data on the at least one computing device, determining a viewport within the encrypted video data, where the viewport represents a subset of a larger amount of video that is presentable at a specific point in time in the video content, decrypting at least a portion of the encrypted video data corresponding to the viewport, where at least a remaining portion of the video that is time synchronized with the viewport remains encrypted, rendering viewport video from the viewport, and playing the viewport video.

A method performed by a video content server is implemented on a computing device and includes: segmenting time synchronized video content into a multiplicity of viewing tiles, producing encrypted time synchronized video content by encrypting each of the multiplicity of viewing tiles, where different encryption keys are used to perform the encrypting for at least some of the multiplicity of viewing tiles, providing the encrypted time synchronized video content to a presentation device, receiving a request from the presentation device for at least one of the encryption keys associated with at least one of the multiplicity of viewing tiles, and providing the at least one of the encryption keys to the presentation device.

DESCRIPTION

Video piracy is a known problem for video content providers. Video pirates illegally obtain and/or disseminate copies of video content. In order to prevent such piracy, video content providers typically employ a variety of anti-piracy measures, including, for example, encryption of the video content. However, there are limits to the efficacy of video content encryption. For example, at some point in time, the video content is decrypted in order to be presented for viewing. From that point in time, the decrypted video content may be exposed to unauthorized copying.

It will be appreciated that such piracy is of similar concern for providers of panoramic video content associated with, for example, real-life events (e.g., sporting events, awards shows, inaugurations, etc.). In accordance with embodiments described herein, the nature of panoramic video viewing may be leveraged to provide a measure of anti-piracy protection that may not be relevant for standard, linear video content.

Figure 1:
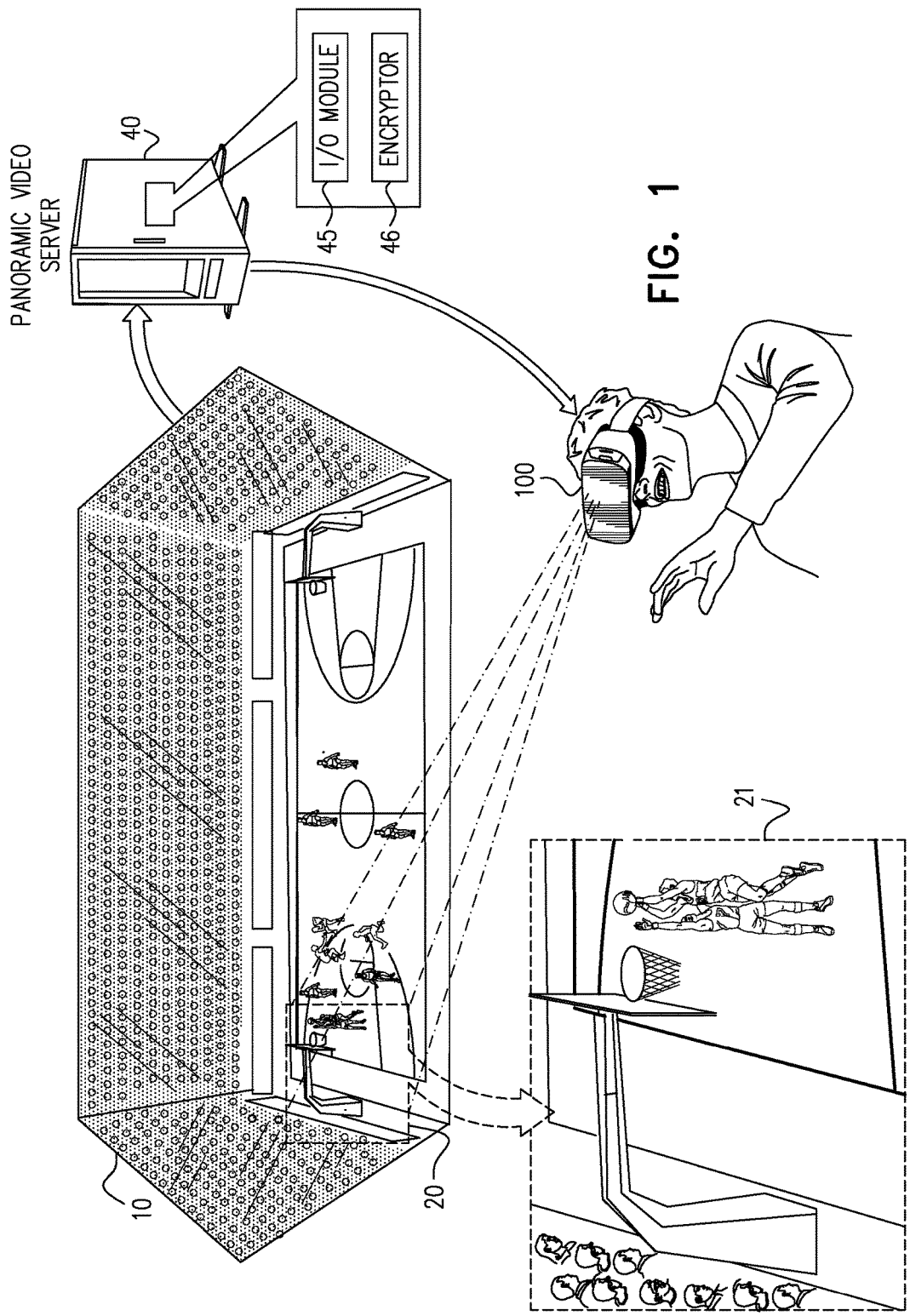
FIG. 1 is a pictorial illustration of viewer viewing an exemplary panoramic video event in accordance with embodiments described herein.

Reference is now made to FIG. 1 which is a pictorial illustration of a viewer viewing an exemplary panoramic video event 10 in accordance with embodiments described herein. As depicted in FIG. 1, Panoramic video event 10 is a basketball game, where panoramic video content from panoramic video event 10 is provided to panoramic video server 40 for processing and generation of related panoramic video content. Panoramic video server 40 comprises input/output (I/O) module 45 and encryptor 46. I/O module 45 may be implemented as a transceiver or similar means suitable for transmitting and receiving data between server 40, panoramic video event 10 and other devices, such as, for example, panoramic video presentation device 100. In operation, one or more panoramic camera feeds (not shown) from panoramic video event 10 are provided via I/O module 45 to panoramic video server 40 for processing using known methods to generate panoramic video content for panoramic video event 10. As may described in greater detail hereinbelow, panoramic video server 40 may employ encryptor 46 to encrypt the panoramic video content, and then provide (via I/O module 45) the encrypted panoramic video content to panoramic video presentation device 100 for viewing. As represented in FIG. 1, panoramic video presentation device 100 may be a wearable headset device, e.g., an HMD, suitable for panoramic video presentation. It will be appreciated, however, that panoramic video presentation device 100 may be implemented using any other device or collection of devices capable of presenting panoramic video content. For example, panoramic video presentation device 100 may be implemented using a computing device and one or more display screens. Similarly, some or all of the processing functionality attributed herein to panoramic video presentation device 100 may be implemented in a second device in communication with panoramic video presentation device 100.

Panoramic video presentation device 100 may be operative to present viewport 20 to the viewer, shown in expanded form in FIG. 1 as panoramic view 21. Viewport 20 represents one of many possible views of one of several views of panoramic video event 10 that may be available at a given point during the presentation of the panoramic video content. It will be appreciated that the viewer may adjust a focus for viewport 20 via panoramic video control commands, for example, by head movements changing the attitude of panoramic video presentation device 100, enabling the viewer to relocate viewport 20 within panoramic view 21 at least in part based on the direction that the viewer is viewing. It will be appreciated that in accordance with some embodiments described, panoramic view 21 may not necessarily represent a full panoramic view; there may be angles or directions not included in panoramic view 21. For example, panoramic view 21 may represent less than a full 360 degree representation of panoramic video event 10; in some embodiments it may not include the spectators sitting behind the viewpoint presented in FIG. 1. Similarly, in some embodiments, panoramic view 21 may also not include a view of the ceiling over the basketball game.

In accordance with embodiments described herein, encryptor 46 may be configured to use multiple, temporally related, encryption keys for panoramic video content. Accordingly, for any given point in time for panoramic video event 10, encryptor 46 may employ one or more given encryption keys to encrypt the data associated with viewport 20, and one or more other keys may be used to encrypt the rest of the temporally parallel data for the rest of panoramic video event 10. In order to present viewport 20 to the viewer, panoramic video presentation device 100 may use the associated decryption key(s) to decrypt the associated encrypted data. However, panoramic video presentation device 100 may not possess the means to decrypt the data for the rest of panoramic video event 10. It will be appreciated that panoramic video presentation device 100 may therefore decrypt a relatively small portion of Panoramic video event 10; this decrypted data may be insufficient to provide a panoramic video experience for another user.

It will be appreciated that while in standard video content, video frames are presented in a generally linear manner according to a temporal progression; panoramic video content potentially has multiple possible temporally parallel viewports. Accordingly, in a worst-case scenario where a pirate obtains the decrypted viewport 20, the resulting content item may approximate standard video content, i.e., a generally linear presentation of video frames. However, a linear presentation of video frames may not provide an overall panoramic video content experience, thereby adding an additional measure of protection for the panoramic aspect of the panoramic video content.

Figure 2:
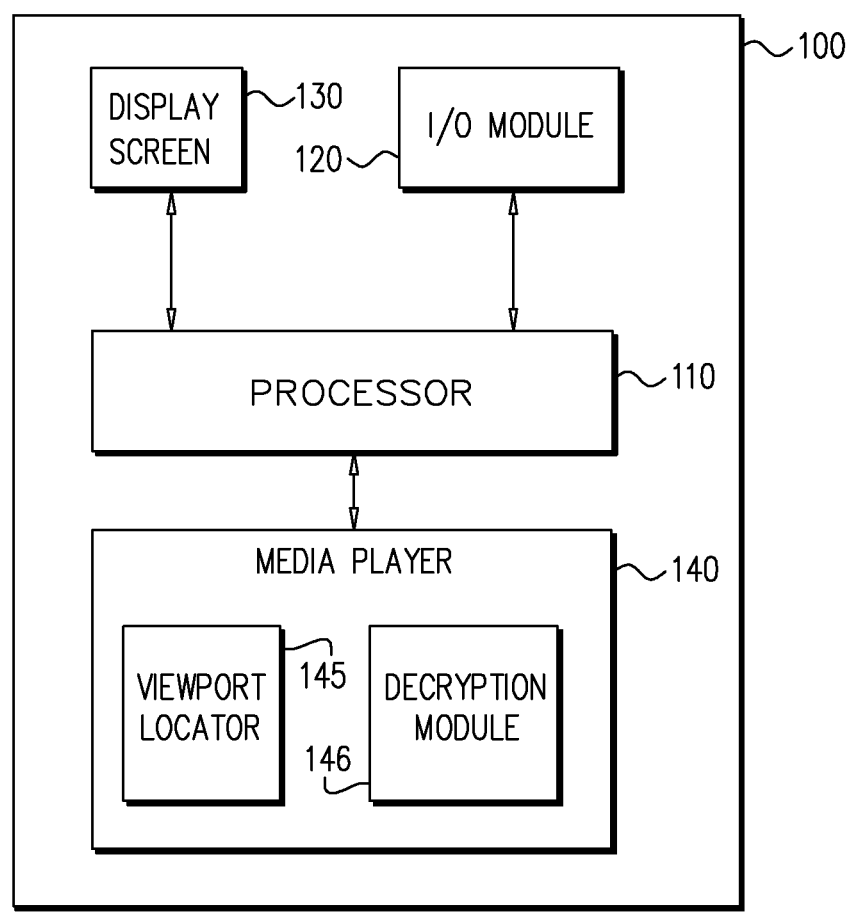
FIG. 2 is a schematic illustration of the panoramic video presentation device of FIG. 1, constructed and operative in accordance with embodiments described herein.

Reference is now made to FIG. 2 which is a schematic illustration of the panoramic video presentation device 100 of FIG. 1, constructed and operative in accordance with embodiments described herein. Panoramic video presentation device 100 may be any suitable presentation device that may support the receiving and/or viewing of panoramic video content. For example, panoramic video presentation device 100 may be implemented as the wearable headset device such as depicted in FIG. 1. It will be appreciated however, that panoramic video presentation device 100 may be configured as a combination of a suitably configured set-top box, a personal computer, a computer tablet, a smart-television, a smartphone, and/or peripheral display screen(s).

Panoramic video presentation device 100 comprises hardware and software components, such as are well-known in the art. Panoramic video presentation device 100 also comprises processor 110, Input/output (I/O) module 120, display screen 130 and media player 140. It will be appreciated that panoramic video presentation device 100 may comprise more than one processor 110. For example, one such processor 110 may be a special purpose processor operative to at least execute media player 140 to render and play a panoramic video content item. Processor 110 may be operative to execute instructions stored in a memory (not shown). I/O module 120 may be any suitable software or hardware component such as a universal serial bus (USB) port, disk reader, modem or transceiver that may be operative to use protocols such as are known in the art to receive panoramic video content from panoramic video server 40 (FIG. 1) over a communications network such as, for example, the Internet. It will be appreciated that the embodiments described herein may also support configurations wherein the panoramic video content is received by a local server and forwarded to I/O module 120 over Bluetooth, WiFi or any other suitable wireless technology. As noted hereinabove, at least some of the functionality attributed herein to panoramic video presentation device 100 may be performed on such a local server. For example, the local server may be operative to perform decryption and/or video rendering on behalf of panoramic video presentation device 100. Similarly, for non-live panoramic video events, panoramic video content may be provided via removable media, or downloaded and stored locally on a disk drive. Display screen 130 may implemented as a component of a wearable headset device (e.g., as goggles as depicted in FIG. 1), or as an integrated or peripheral component in a non-headset implementation. Display screen may be operative to at least present the visual aspects of panoramic video content as rendered by media player 140.

Media player 140 may be an application implemented in hardware or software that may be executed by processor 110 in order to at least present panoramic video content to a user of panoramic video presentation device 100. As may be described hereinbelow, media player 140 may also invoke viewport locator 145 and decryption module 146 to perform a process (described hereinbelow) for viewport decryption while presenting panoramic video content. It will be appreciated that media player 140 may also comprise additional functionalities as necessary for the playing of panoramic video content.

It will be appreciated that the location of viewport 20 (i.e., within panoramic video event 10) may be determined according to commands input by the viewer (e.g., according to head movements, or manipulation of controls (not shown) on panoramic video presentation device 100 (FIG. 2). It will similarly be appreciated that panoramic video server 40 (FIG. 1) may be operative to provide panoramic video content to large numbers of panoramic video presentation devices 100. Accordingly, it may be more efficient for each panoramic video presentation device 100 to perform such definition locally instead of panoramic video server 40 continually defining and providing viewport 20 separately for each receiving panoramic video presentation device 100. For example, panoramic video server 40 may provide either all, or at least a significant subset of the data for a panoramic video content item to panoramic video presentation device 100. Panoramic video presentation device 100 may then render viewport 20 from among the data received from panoramic video server 40.

Figure 3:
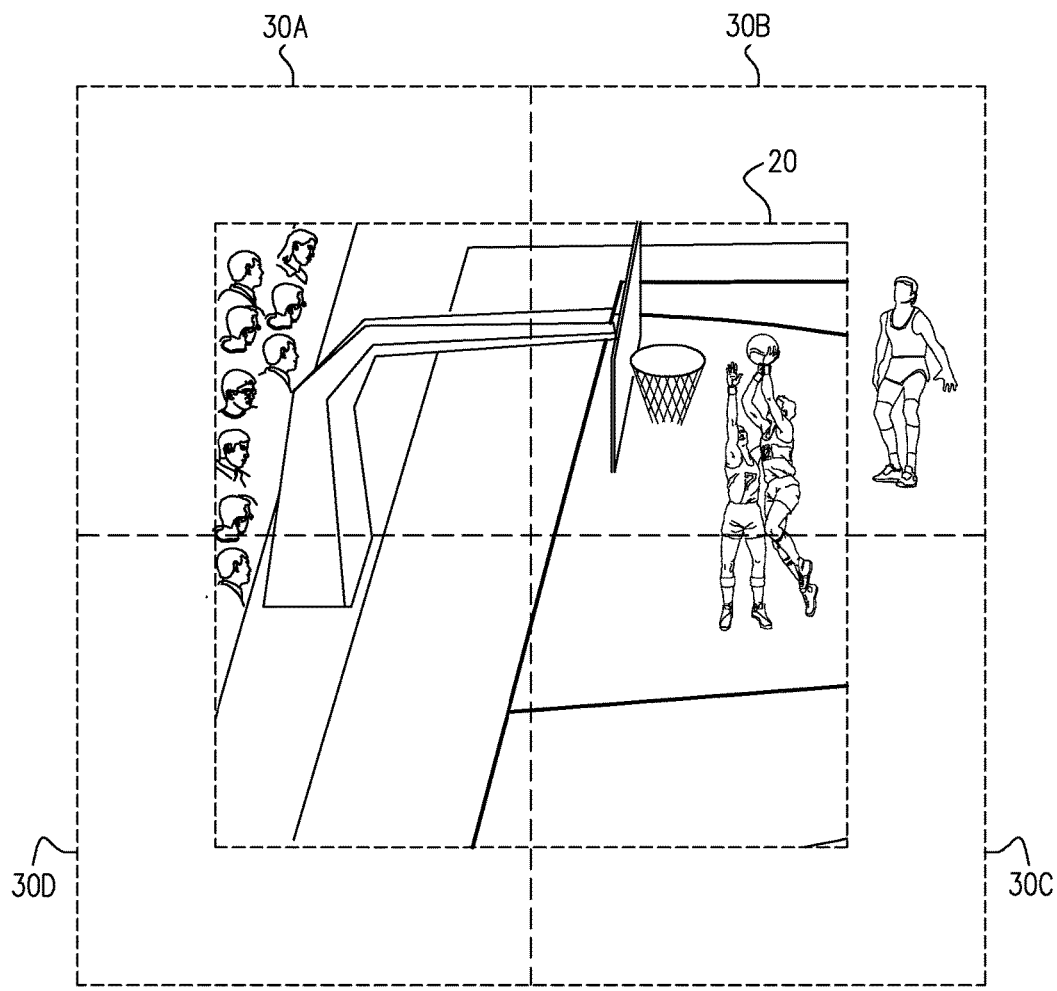
FIG. 3 is a pictorial illustration of a portion of the panoramic video event of FIG. 1.

Reference is now made to FIG. 3 which is a pictorial illustration of viewport 20 and surrounding portions of panoramic video event 10 (FIG. 1). In accordance with embodiments described herein, panoramic video server 40 may divide panoramic video event 10 into a grid of viewing tiles 30, shown in FIG. 3 as viewing tiles 30A-D. For example, each frame Fi of the panoramic video content may be divided into one or more viewing tiles 30. In accordance with embodiments described herein, each viewing tile 30 may be encrypted by encryptor 46 with a different encryption key. For example, each viewing tile $T_j$ in $F_i$ may be encrypted with a special key $K_{ij}$.

Panoramic presentation device 100 may decrypt the relevant viewing tiles 30 as necessary when rendering viewport 20. For example, the entirety of panoramic video event 10 may be composed of 20 or more viewing tiles 30, but panoramic video presentation device 100 may have to decrypt viewing tiles 30A-D to access the data used to render viewport 20. It will be appreciated that panoramic presentation device 100 may "stitch together" at least portions of viewing tiles 30A-D in order to render viewport 20. It will similarly be appreciated that the decrypted viewing tiles 30A-D may also include video not associated with viewport 20; accordingly panoramic video presentation device 100 may be operative to crop portions of viewing tiles 30A-D in order to render viewport 20.

It will be appreciated that in such manner, a small portion of Panoramic video event 10 may be decrypted, i.e., be "in the clear", on panoramic video presentation device 100 at any one time. Accordingly, even if the "in the clear" portion is harvested by a video pirate, it may not provide a full panoramic video experience.

Figure 4:
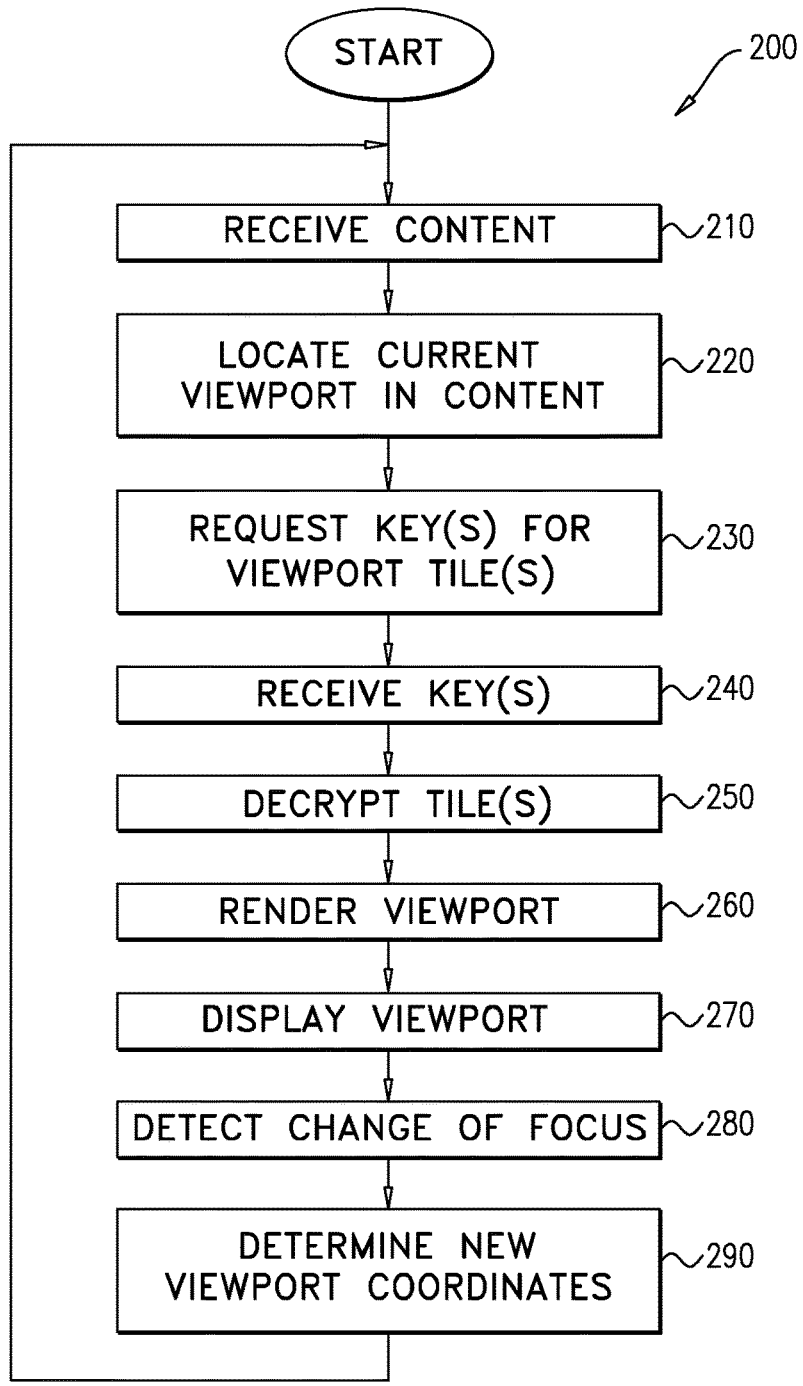
FIG. 4 is a flowchart of an exemplary viewport decryption process to be performed by the panoramic video presentation device of FIG. 1.

Reference is now made to FIG. 4 which is a flowchart of an exemplary viewport decryption process 200 to be performed on panoramic video presentation device 100. Media player 140 may receive (step 210) the panoramic video content for panoramic video event 10 (FIG. 1) from panoramic video server 40 (FIG. 1) via I/O module 120. It will be appreciated that panoramic video event 10 may be associated with a live event, such that the received panoramic video content may be streamed to panoramic video presentation device 100 as it becomes available. In such a case, panoramic video server 40 may provide the data for panoramic video event 10 as it becomes available, regardless of whether or not the data is specifically associated with representing viewport 20 and its component viewing tiles 30 as depicted in FIG. 3. Alternatively, panoramic video server 40 may provide a subset of panoramic video event 10 in the form of viewing tiles 30 from the area of panoramic video event 10 including viewport 20. For example, panoramic video server 40 may provide viewing tiles 30A-D as depicted in FIG. 3.

Media player 140 may invoke viewport locator 145 to locate (step 220) the location of viewport 20 within panoramic video event 10 based on a previous location and any movement or "focus" commands input by the viewer. It will be appreciated that a default initial location may be defined when beginning process 200. The determined location may also include identifying which viewing tile(s) 30 are to be associated with at least part of viewport 20, e.g., viewing tiles 30A-D as depicted in FIG. 3.

Media player 140 may request (step 230) one or more decryption keys for the viewing tiles 30 identified in step 220. For example, media player 140 may use I/O module 120 to request the key(s) for viewing tiles 30A-D from panoramic video server 40, where the key(s) requested may be referred to in terms of $K_{ij}$ as described hereinabove, where "j" denotes a given viewing tile 30, and "i" denotes a frame, or group of time synchronized frames. Media player 140 may receive (step 240) the requested key(s) from panoramic video server 40 via I/O module 120. It will be appreciated that the embodiments described herein may support the use of any known method for the secure exchange of decryption keys, e.g., software obfuscation, extensible authentication protocol transport layer security (EAP-TLS). It will also be appreciated that panoramic viewing server 40 may determine which viewing tiles 30 to provide to panoramic video presentation device 100 in a future iteration of step 210 based on the decryption key(s) requested in step 230.

Media player 140 may invoke decryption module 146 to decrypt (step 250) viewing tiles 30 associated with the location of viewport 20. It will be appreciated that independent of the scope of the data received from panoramic video server 40 in step 210 (i.e., viewing tiles 30 for all, or part, of panoramic video event 10), a subset of panoramic video event 10 may be decrypted in step 250. For example, as depicted in FIG. 3, four viewing tiles 30 (viewing tiles 30A-D) may be decrypted. It will be appreciated that the embodiment of FIG. 3 may be exemplary; viewing tiles 30 may not necessarily be of the same approximate size as viewport 20. In some embodiments, viewing tiles 30 may be smaller or larger than viewport 20. Accordingly, in some implementations, the entirety of viewport 20 may be included in one viewing tile 30. It will similarly be appreciated that the size of viewport 20 may not be constant for all panoramic video presentation devices 100. It will also be appreciated that in some embodiments, some of viewing tiles 30 may not necessarily be of the same shape or size. Also, in some embodiments the data for panoramic video event 10 may be provided by panoramic video server 40 as a series of encrypted objects from which viewport 20 may be derived in a similar manner as described with respect to viewing tiles 30.

Media player 140 may render (step 260) viewport 20 from the decrypted viewing tile(s). It will be appreciated that step 260 may include decoding of encoded video data, as necessary. Media player 140 may display (step 270) the rendered viewport on display screen 130 (FIG. 2).

Media player 140 may detect (step 280) a change of focus for viewport 20, i.e., the viewer may indicate a change in the relative location of viewport 20 within panoramic video event 10. For example, the viewer may implicitly request to change the focus via head movements registered by panoramic video presentation device 100. The viewer may also explicitly request to change the focus using, for example, physical controls on panoramic video presentation device 100 and/or voice commands.

Based on the detected change in focus, media player 140 may determine (step 290) new coordinates for the location of viewport 20 within panoramic video event 10. Processing control may then return to step 210.

It will be appreciated that the order of the steps in process 200 may be exemplary. For example, step 230 may be performed in parallel with, or prior to, step 210. Further-more, step 210 may not necessarily be performed for each iteration of process 200. For example, the receiving of non-live panoramic video content may not necessarily be synchronized with steps 220-290. For example, the non-live panoramic video content may be stored in a buffer for processing as needed while process 200 continues. Similarly, some live panoramic video events 10 may be provided with a slight delay; in such cases the data received in step 210 may also be buffered for processing.

It will be appreciated that while different viewers of the panoramic video content may elect to focus on different portions, i.e., viewports 20, of panoramic video event 10, but no single viewer may possess the entirety of panoramic video event 10 "in the clear". A pirate may not be able to replicate a panoramic experience based on the "in the clear" data as viewport 20 may represent a relatively small portion of panoramic video event 10. The pirate may actually stream the contents of viewport 20, but this may not approximate the panoramic experience of viewing and navigating within the entirety of panoramic video event 100.

It will also be appreciated that the decryption keys may be provided from either server 40 (FIG. 1) or via a local, secure element on panoramic video presentation device 100 using, for example, digital rights management (DRM) and/or a hardware security module (HSM). Using a local, secure element for decryption keys may reduce latency and provide a more robust and stable service without impacting on the anti-piracy features described herein.

It will also be appreciated that as noted hereinabove HDMs may function in a generally similar manner for VR content presentation. Accordingly, the embodiments described herein may also support segmentation of VR content into viewing tiles 30 and using different encryption keys to encrypt different viewing tiles; where a subset of the encrypted viewing tiles 30 are decrypted to provide an in the clear viewport 20 for the VR content.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for protecting video content, the method implemented on at least one computing device and comprising:
receiving said video content as encrypted video data on said at least one computing device;
determining a viewport within said encrypted video data, wherein said viewport represents a subset of a larger amount of video that is presentable at a specific point in time in said video content wherein said determining comprises determining a location of said viewport within said encrypted video data;

decrypting at least a portion of said encrypted video data corresponding to said viewport, wherein at least a remaining portion of said video that is time synchronized with said viewport remains encrypted, where said decrypting comprises, sending a request for at least one decryption key to a provider of said video content, wherein said at least one decryption key is requested according to said location, and receiving said at least one decryption key from said provider;

rendering viewport video from said viewport; and playing said viewport video.

2. The method according to claim 1 wherein said video content is panoramic video content.

3. The method according to claim 1 wherein said video content is virtual reality (VR) content.

4. The method according to claim 1 and further comprising:

detecting a change in focus associated with said viewport; and performing said determining a viewport according to said change in focus.

5. The method according to claim 4 wherein said detecting comprises detecting user input via a head-mounted display (HMD) device.

6. The method according to claim 1 wherein:

said encrypted video data is segmented into encrypted video tiles;

said location for said viewport is associated with at least two of said encrypted video tiles; and said at least one decryption key comprises at least two decryption keys for said at least two said encrypted video tiles.

7. The method according to claim 6 wherein said rendering comprises:

stitching together decrypted data from said at least two encrypted video tiles.

8. The method according to claim 6 wherein said encrypted video tiles correspond to frames of said video content.

9. The method according to claim 1 wherein said rendering comprises:

cropping at least some decrypted video data, wherein said decrypted video data was decrypted with said at least a portion during said decrypting.

10. The method according to claim 1 wherein said remaining portion of said video is encrypted with a different encryption key than said at least a portion.

11. The method according to claim 1 wherein said video content is from a live event.

12. A video content rendering system implemented on at least one computing device and comprising:

means for receiving said video content as encrypted video data on said at least one computing device;

means for determining a viewport within said encrypted video data, wherein said viewport represents a subset of a larger amount of video that is presentable at a specific point in time in said video content wherein said means for determining comprises means for determining a location of said viewport within said encrypted video data;

means for decrypting at least a portion of said encrypted video data corresponding to said viewport, wherein at least a remaining portion of said video that is time synchronized with said viewport remains encrypted, where said means for decrypting comprises, means for sending a request for at least one decryption key to a provider of said video content, wherein said at least one decryption key is requested according to said location, and means for receiving said at least one decryption key from said provider;

means for rendering viewport video from said viewport; and means for playing said viewport video.

13. The video content rendering system according to claim 12 wherein said video content is panoramic video content.

14. The video content rendering system according to claim 12 wherein said video content is virtual reality (VR) content.

15. The video content rendering system according to claim 12 wherein said video content is from a live event.

16. A system comprising:

a memory storage; and a hardware processing unit coupled to the memory storage, wherein the processing unit is configured to:

receive said video content as encrypted video data;

determine a viewport within said encrypted video data, wherein said viewport represents a subset of a larger amount of video that is presentable at a specific point in time in said video content wherein said processing unit being configured to determine comprises said processing unit being configured to determine a location of said viewport within said encrypted video data;

decrypt at least a portion of said encrypted video data corresponding to said viewport, wherein at least a remaining portion of said video that is time synchronized with said viewport remains encrypted, where said processing unit being configured to decrypt comprises said processing unit being configured to, send a request for at least one decryption key to a provider of said video content, wherein said at least one decryption key is requested according to said location, and receive said at least one decryption key from said provider;

rendering viewport video from said viewport; and playing said viewport video.

17. The system according to claim 16 wherein said video content is panoramic video content.

18. The system according to claim 16 wherein said video content is virtual reality (VR) content.

19. The system according to claim 16 wherein said processing unit is further configured to:

detect a change in focus associated with said viewport; and perform said determining a viewport according to said change in focus.

20. The system according to claim 19 wherein said processing unit being configured to detect comprises said processing unit being configured to detect user input via a head-mounted display (HMD) device.

* * * * *